United States Patent [19]

Pitches et al.

[11] 4,086,569
[45] Apr. 25, 1978

[54] COMMUNICATION SYSTEMS

[75] Inventors: Brian Edward Pitches; Robert Malcolm Stuart Murray, both of Edinburgh, Scotland

[73] Assignee: Ferranti Limited, Hollinwood, England

[21] Appl. No.: 718,335

[22] Filed: Aug. 27, 1976

[30] Foreign Application Priority Data

Aug. 30, 1975 United Kingdom ............ 358571/75

[51] Int. Cl.² ........................................... H04Q 11/00
[52] U.S. Cl. .................... 340/167 R; 340/163; 340/170; 340/147 LP
[58] Field of Search .................. 340/147 A, 151, 170, 340/310 R, 310 A, 167 R, 163, 147 MD, 147 LP

[56] References Cited

U.S. PATENT DOCUMENTS

| | | | |
|---|---|---|---|
| 2,378,326 | 6/1945 | Rees | 340/170 |
| 3,702,460 | 11/1972 | Blose | 340/310 A |
| 3,786,421 | 1/1974 | Wostl | 340/147 A |
| 3,824,544 | 7/1974 | Simjian | 340/147 A |
| 3,897,887 | 8/1975 | Goldberg | 340/151 X |

*Primary Examiner*—Harold Pitts
*Attorney, Agent, or Firm*—Cameron, Kerkam, Sutton, Stowell & Stowell

[57] ABSTRACT

A communication system for communicating between a central control unit and a plurality of controlled units, all interconnected by a single communication channel, wherein communication is time multiplexed with control words being transmitted in each direction during each time interval allocated to each separate controlled unit. The control words are transmitted during half-cycles of a periodic clock signal of one polarity, while data from the controlled units may be transmitted to the central control unit only during half-cycles of the periodic signal of the opposite polarity.

12 Claims, 7 Drawing Figures

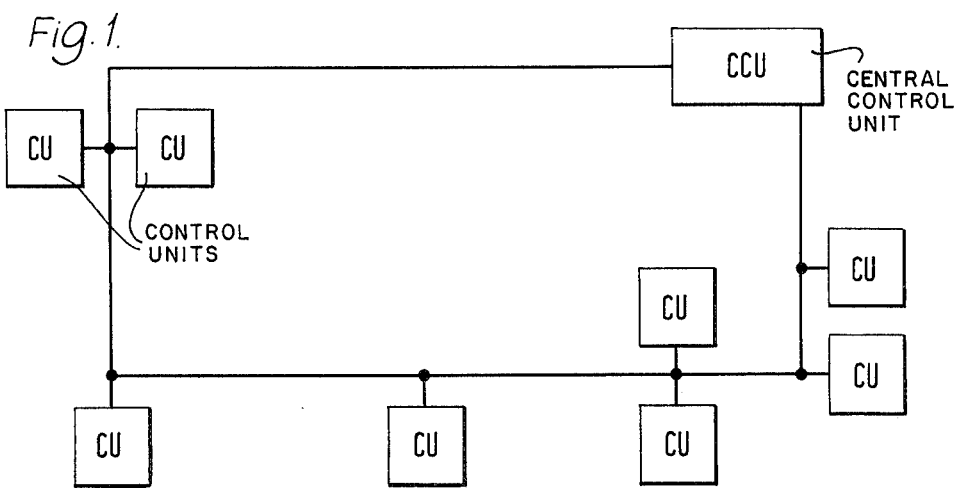

|    | A | B | C |   | 1 | 1 | X |     |
|----|---|---|---|---|---|---|---|-----|
| Q  | X | 0 | 0 |   | 1 | 1 | X | Q   |
| CG | X | 1 | 0 |   | 0 | 0 | X | EN  |
| R  | X | 1 | 1 |   | 0 | 1 | X | H   |
| FD | X | 0 | 1 |   | 1 | 0 | X | INT |
| AT | 1 | X | X |   | 0 | 1 | X | AC  |
|    |   |   |   |   | X | X | 1 | S   |

COMMUNICATION SYSTEMS

FIELD OF THE INVENTION

This invention relates to communication systems, and in particular to such systems for providing communications between a central control unit and a plurality of controlled units over a single communication channel linking all the units.

It is often desired that limited types and quantities of information are transferred between a control centre and a plurality of other units, for example where similar sets of equipment are to be controlled from a central point. One such situation is that of a dispensing system for a petrol filling station, where pumps are necessarily under the control of a central kiosk, with transfer of instructions from the kiosk to the pumps and transfer of information from the pumps to the kiosk.

Commercially available data linking systems generally offer higher rates of data transfer than are strictly necessary and justifiable, and the cost and complexity of the equipment is usually proportional to its speed of operation. It is, of course, possible to provide separate communication channels to each controlled unit, but this adds to the cost unnecessarily.

DESCRIPTION OF THE PRIOR ART

Communication systems are known in which a single communication channel may be used by employing frequency-division multiplexing, or carrier, techniques. Such a system is described, for example, in U.S. Pat. No. 3,897,887. Other systems, such as that described in U.S. Pat. No. 3,702,460, use addressing techniques in which a selected control unit is addressed and instructed as required. This has the disadvantage that, effectively, only one such unit is under control until a particular phase of the operation has been completed.

Time division multiplex techniques are known in which a periodic control signal is used to control communication in different directions or between different units. In U.S. Pat. No. 2,378,326, for example, there is described a system in which the positive half-cycles of a sine wave are used for communication between a first pair of units, and the negative half-cycles are used for communication between a second pair of units. Although this could easily be modified to control communication between one pair of units in opposite directions, it is not possible to use the technique described for a large number of units.

As pointed out above with respect to the known addressed system, it is desirable to be able to monitor continuously the operation and performance of each controlled unit, so that any faults may be immediately detected. It is therefore an object of the invention to provide a communication system which makes low demands on communication channels and equipment complexity and cost while maintaining complete monitoring of the performance of the controlled units.

SUMMARY OF THE INVENTION

According to the invention there is provided a communication system for providing communication between a central control unit and a plurality of controlled units over a single communication channel linking all of the units which includes, at the central control unit, clock generator means operable to generate a periodic signal, timing means for generating a repetitive sequence of time intervals each of which is allocated for communication between the central control unit and a different one of the controlled units only during half-cycles of the periodic signal of one polarity, a control word generator operable to generate a number of control words, control means operable to transmit a selected control word to the designated controlled unit during part only of each time interval allocated to that controlled unit, data receiving means for receiving data from a controlled unit during half-cycles of the periodic signal of the opposite polarity, and display means for displaying such received data; and at each controlled unit, a control word generator operable to generate a number of control words different from those generated in the central control unit, control means responsive to a control word received from the central control unit during the time interval allocated to that controlled unit to transmit an appropriate control word to the central control unit during another part of each said time interval, register means for storing data generated at the controlled unit, and data transmitting means for transmitting said data to the central control unit during half-cycles of the periodic signal of said opposite polarity on receipt of an appropriate control word from the central control unit.

Preferably the single communication channel comprises a pair of cores in a multiple cable, other cores which may be used for other purposes, such as audio communication between the central control unit and a controlled unit.

Control information from the central unit, and requested information from the pump requires the use of words each of plurality of bits, and hence a plurality of cycles of the periodic control signal. A recognition format is required for such words and we have found that a suitable format is for a fixed word length with end bit positions always having preset values for a valid word, particularly where this can occur at a receiver only when a whole valid word has been received. As the bits appear sequentially cycle by cycle it is convenient to use a shift register of the fixed word length and a binary "1" value for at least that bit which is at the exit end of the shift register.

In a time multiplex system each unit's control and/or request time slot will need a number of cycles corresponding to the fixed word length, and provision may be made for two-way communication in a time slot if desired. As well as instruction transfers, the transfer of data, say regarding price and quantity of fuel dispensed, or price updates, may be time multiplexed in data blocks. However, it is simpler and generally preferred herein for data transfer from the controlled units not to be time multiplexed.

It is preferred to use a periodic signal of the order of 400 Hz. The communication channel may conveniently be a triple-and-earth cable having common and data cores as well as separate cores for audio and timing signals.

It is considered important that the bit signal should having a high degree of noise immunity. A suitable arrangement may use a source of a much higher frequency signal than said periodic signal so that many cycles of the former will appear during each half cycle of the latter to represent one binary value. Then, a receiver may use an integrator producing a monotonic step signal in response to said higher frequency signal, and thresholding means for producing an indication of that one binary value only when the step of signal exceeds a preset level. The amplitude of the higher frequency signal need not then be of the same order or higher than the maximum anticipated noise.

BRIEF DESCRIPTION OF THE DRAWING

A preferred embodiment of the invention will now be described by way of example, with reference to the accompanying drawings, in which:

FIG. 1 is a block diagram of an overall system;

DESCRIPTION OF THE PREFERRED EMBODIMENT

In FIG. 1 a central control unit CCU is shown connected by a single cable to a plurality of controlled units CU. Specifically, the system can be for a petrol filling station forecourt so that the control unit CCU is the central kiosk or other pay-and-control point and the controlled units CU are blender-type petrol pumps.

The cable represents a common communication channel between the central control unit CCU and the controlled units CU. As already stated, this cable may conveniently comprise a triple-and-earth cable linking all the units in a ring.

For a time multiplex system, blocks of consecutive cycles are assigned to each controlled unit and these blocks conveniently coincide in number with the word length of the system in the same way as the lengths of the receiver shift registers. Prior to each complete poll of the controlled units, or at some convenient multiple thereof, counters at each controlled units can be synchronised by the transmission of a predetermined sequence of bits.

Figure 2A:
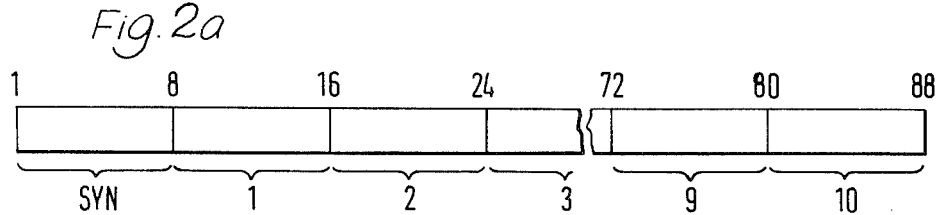
FIGS. 2a, 2b, and 2c illustrate the control sequence used for a time-division multiplexed system.
Figure 2B:
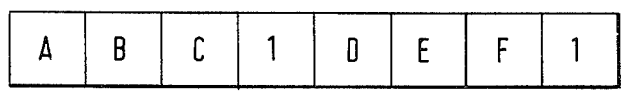
Figure 2C:
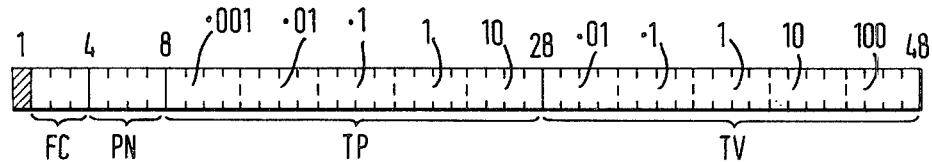

FIGS. 2a, 2b, and 2c illustrate the use of a continuous sequence of control words to control up to ten controlled units. A complete sequence comprises 88 bits, made up of eleven eight-bit words is shown in FIG. 2a. The first of these words SYN in each cycle is used for synchronising purposes, as already explained. Each subsequent eight-bit word relates to a different controlled unit, and may contain any one of the control words illustrated in FIG. 2b. Whilst the equipment is switched on there will always be a control word transmitted to and from each controlled unit. As shown in FIG. 2b, each eight-bit word is split to provide three bits, shown as bits A, B, and C transmitted by the controlled unit, then a logic '1' which is always present, then three bits, D, E and F transmitted by the control kiosk, and finally another logical '1'. These bits are all transmitted during clock pulse half-cycles of the same polarity, say the positive half-cycles. Bits marked "X" have no significance, and may have either value.

The lower part of FIG. 2b shows a possible sequence of control words. In the case of a petrol pump installation there will be as follows:

Where any particular pump is idle, but ready for use, it will transmit a three-bit word Q indicating that it is in the quiescent state. A different three-bit word having the same significance is transmitted by the central control kiosk. When a pump is activated, either by the removal of the nozzle from its holster or by selection of a fuel grade, the pump will transmit to the kiosk the "calling" control word CG. This produces a signal in the kiosk which will normally be answered by the operator pressing a button which causes an "enable" control word EN to be transmitted to the pump. The pump is now able to deliver fuel, at the same time sending the "running" control word R to the kiosk, and whilst doing so volume and total cost data is stored at the pump. At any time during fuel delivery the kiosk operator may halt delivery, for example if he sees that fuel spillage is occuring. Such action results in the "halt" control word H being transmitted to the pump. When fuel delivery ceases, and the hose nozzle is replaced, the pump transmits the "finished" control word FD.

The kiosk operator may now call up from the pump the final information relating to total fuel quantity delivered and total price, by causing an "interrogate" signal INT to be sent to the pump. When this is received the pump sends this data to the central kiosk as a continuous stream of bits, each being sent in a half-cycle of the clock pulse signal of opposite polarity to that used for the control words say the negative half-cycle. The format of such data will be described below. Having received the data, and payment by the customer, the kiosk operator may cancel the pump and kiosk displays by causing an "accept" signal AC to be sent to the pump. Both pump and kiosk then revert to the quiescent condition. Use of the audio intercom facility is controlled by an "attention" control word AT transmitted by the pump and a "speak" control word S transmitted by the kiosk. The control words will always occur in the sequence indicated above except that the "hold" instruction, and the "attention" and "speak" audio control words may occur at any time.

FIG. 2c illustrates one possible format of the data transmitted from pump to kiosk on receipt of an "interrogate" signal. This is a 48-bit word containing details of the fuel grade delivered, the pump identity, the price of fuel delivered, and the total cost of such fuel. The price and volume data is conveniently sent in binary-coded decimal form, with blocks of four bits indicating successively the factors such as hundredths, tenths, units and tens of, say, pounds and gallons. As illustrated in FIG. 2c the data word may comprise a start bit, two bits FC indicating the grade of fuel delivered, a four-bit number PN indicating the pump in use, twenty bits indicating the total price TP of the fuel delivered, and finally 16 or 20 bits indicating the total volume TV of fuel delivered. The higher number of bits for fuel quantity covers the metric case where fuel may be measured in hundreds of liters. As will be explained later, this 48-bit word is transmitted twice, giving a total of 96 bits, lasting therefore slightly longer than a complete control word cycle. The asynchronous transmission of the data is no problem since the operator can only deal with one pump at a time, and the time taken to call up the data is very small.

Figure 3:
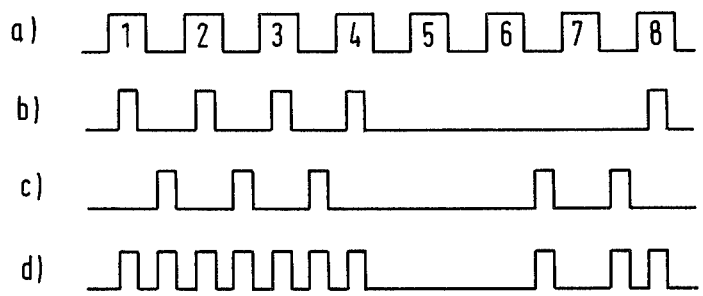
FIG. 3 illustrates the interleaving of signals on the communication channel.

FIG. 3 illustrates the interleaving of control words and data on the communication channel between the pumps and the control kiosk. All control signals are sent on the opposite half-cycles to those used for the data sent from the pump, as already stated.

FIG. 3a shows a square-wave clock pulse train such as is generated by a clock pulse generator in the central kiosk and transmitted to the pumps along a common clock pulse channel separate from the main communication channel. FIG. 3b shows the control words sent to and from a particular pump, and illustrates the "running" signal R sent from pump to kiosk and the "enable" signal EN sent from kiosk to pump. These two control words are repeated each time that pump's time slot occurs, and are send during positive half-cycles of the clock pulse train. FIG. 3c shows part of the data signal being transmitted from another pump to the kiosk at the same time. This is transmitted during negative half-cycle of the clock pulse train.

Finally, FIG. 3d shows the state of the data communication channel during the period in question with the interleaved control words and data signals appearing on it.

Figure 4:
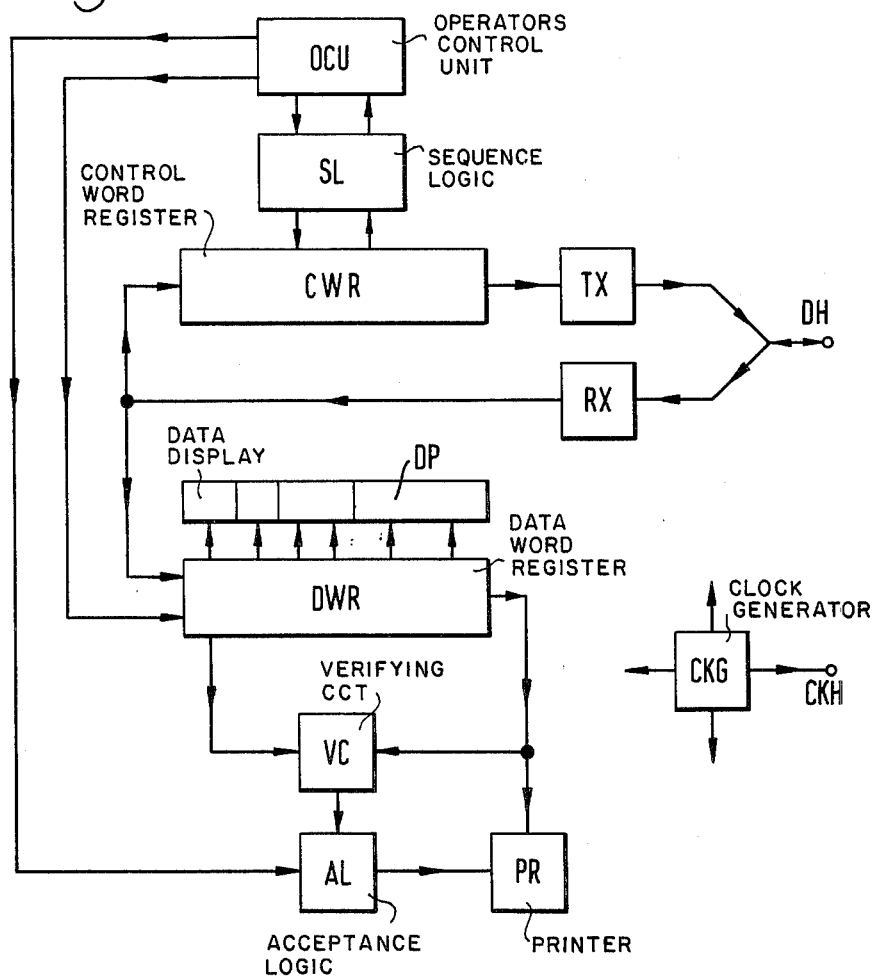
FIG. 4 is a block diagram of a central control unit.

FIG. 4 is a schematic block circuit diagram of the central control unit or operator's kiosk. The operators control unit OCU is connected to a control word register CWR by timing means in the form of sequence logic SL operable to allocate the separate time slots for each pump to be controlled. Under the control of the sequence logic the control word register applies a required control word to the transmitter TX which is connected to the data highway DH. The sequence logic, register and transmitter are fed with clock pulses from a central clock pulse generator CKG which also applies clock pulses to the clock highway CKH.

Incoming control words and data on the data highway DH are applied to the receiver RX. The output of the receiver is connected both to the control word register CWR and to a data word register DWR. As already stated, incoming control words from the pumps appear on half-cycles of the clock waveform of opposite polarity to those during which pump data occurs, and hence the two registers will accept only the appropriate part of the received information. Any control words received will result in the appropriate indication being given on the operators control unit OCU.

When the "interrogate" control word is sent out, it will be followed by data in the form illustrated in FIG. 2c. The data word register DWR will hold the first 48 bits of the data word, that is the first run-through of the data, and will then compare that with the second appearance of the data. The comparison is conveniently carried out by a verifying circuit VC which compares corresponding bits of the first and second appearances of the data. When the data is verified, acceptance logic AL may be instructed by the control unit OCU to allow the data to be printed on a printer PR. At the same time the data may be displayed on a data display DP.

No details are given of the various parts of the block diagram described as the working of these is well-known.

Figure 5:
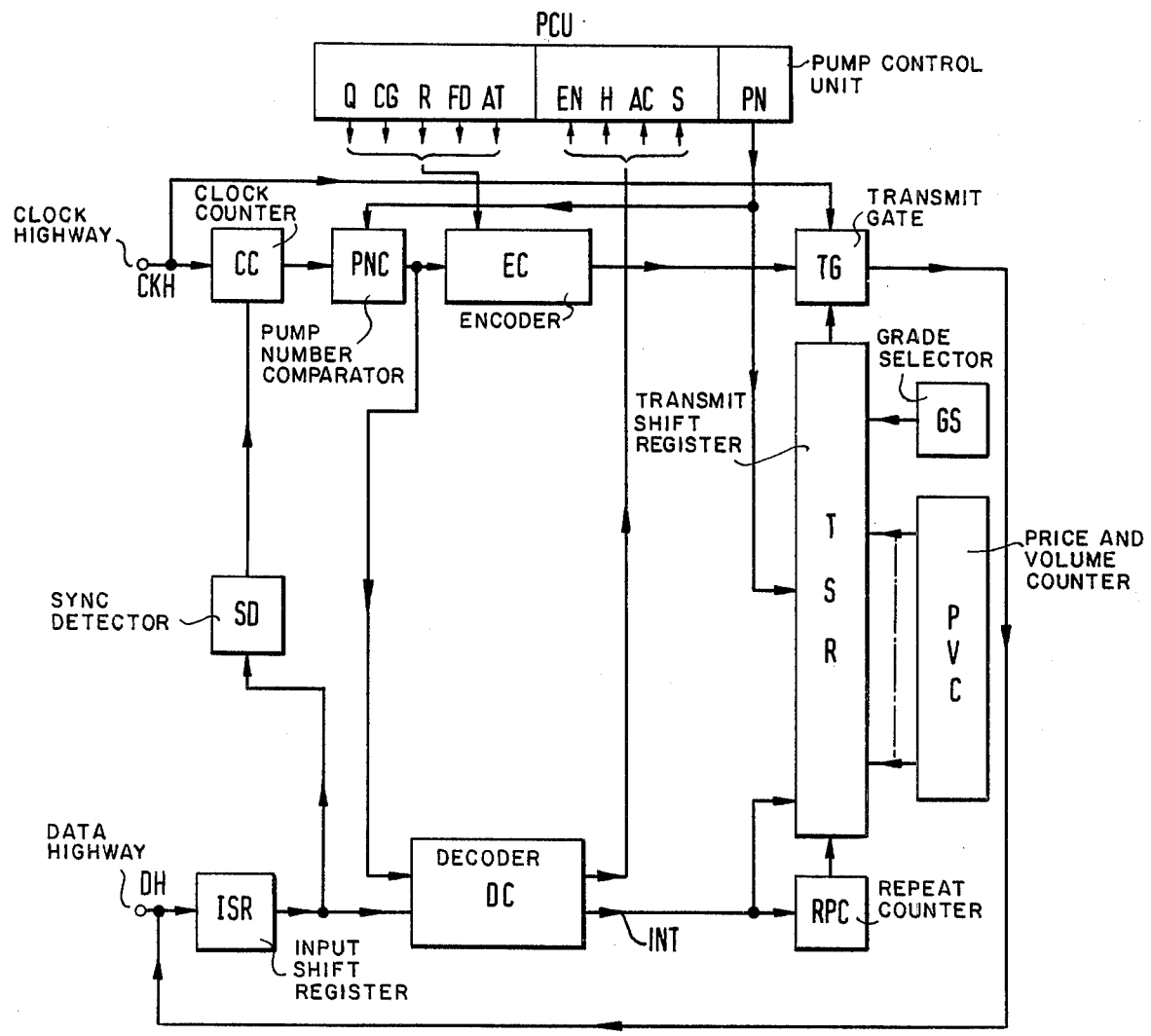
FIG. 5 is a block diagram of a controlled unit.

FIG. 5 illustrates the block circuit of the blender pump itself.

Each pump is connected to the central control unit by the common data and clock highways DH and CKH. Incoming data, which will only be in the form of control words, is initially fed into the input shift register ISR where the synchronising bits are detected by the sync detector SD. Detection of these bits starts a clock counter CC which counts clock pulses until it reaches a number indicating that the next block of pulses on the data highway relate to the pump in question. This is done by comparing the counter in the clock counter CC with the pump number PN present in the pump control unit PCU, by means of the pump number comparator PNC. The output of the pump number comparator is applied as an "enable" input to a decoder DC and an encoder EC. The decoder, when enabled, decodes the control words transmitted to the pump, and applies the appropriate signals to the pump control unit PCU to cause the appropriate pump response. The exception to this is the "interrogate" signal INT which is not applied to the pump control unit. Code words from the pump control unit PCU to be transmitted to the kiosk are produced by an encoder EC in response to the appropriate signals from the PUMP control UNIT PCU. The output of the encoder EC is applied, though transmit gating TG to ensure the correct pulse timing, to the data highway DH.

When the pump is called into use, the customer sets the appropriate grade of fuel required. The grade selector GS causes the appropriate two bits of binary data to be stored in a transmit shift register TSR (FIG. 2c). The price and volume counters PVC of the pump also apply inputs to the same shift register, and the pump number code is also stored there. When the customer has finished delivery of fuel, and the operator wishes to know the final price and volume data, the "interrogate" signal INT is initiated. This signal from the decoder DC causes the contents of the transmit shift register TSR to be clocked through the transmit gating TG onto the data highway DH, and also causes a repeat counter RPC to ensure that the 48 bits of data are then repeated for verification purposes.

As with the kiosk circuitry, no details of the individual elements of the block diagram are given, as these are well known.

The block diagrams of FIGS. 4 and 5 illustrate only particular embodiments of the invention, and other block circuit arrangements may be used.

The numbers of bits allocated to control and data words may be varied, as may the meanings of those words. Any suitable synchronising arrangement may be used.

Various additions may be made to improve the noise immunity of the transmitted information, such arrangements being well-known.

We claim:

1. A communication system for providing communication between a central control unit and a plurality of controlled units over a single communication channel linking all of the units which includes, at the central control unit, clock generator means operable to generate a periodic signal, timing means for generating a repetitive sequence of time intervals each of which is allocated for communication between the central control unit and a different one of the controlled units only during half-cycles of the periodic signal of one polarity, a control word generator operable to generate a number of control words, control means operable to transmit a selected control word to the designated controlled unit during part only of each time interval allocated to that controlled unit, data receiving means for receiving data from a controlled unit during half-cycles of the periodic signal of the opposite polarity, and display means for displaying such received data; and at each controlled unit, a control word generator operable to generate a number of control words different from those generated in the central control unit, control means responsive to a control word received from the central control unit during the time interval allocated to that controlled unit to transmit an appropriate control word to the central control unit during another part of each said time interval, register means for storing data generated at the controlled unit, and data transmitting means for transmitting said data to the central control unit during half-cycles of the periodic signal of said opposite polarity on receipt of an appropriate control word from the cental control unit.

2. A system as claimed in claim 1 in which the timing means of the central control unit is operable to include in each complete sequence of time intervals a predetermined sequence of synchronising information.

3. A system as claimed in claim 1 in which the control means of each controlled unit and of the central control unit is operable to ensure that some at least of the control words are transmitted only in a predetermined sequence.

4. A system as claimed in claim 1 in which each control means is operable to add to any transmitted control word at least one bit of predetermined fixed sense.

5. A system as claimed in claim 1 in which the data transmitting means of each controlled unit is operable to transmit all data held in the register means as a single multiple-bit word.

6. A system as claimed in claim 5 in which the data transmitting means includes means for transmitting additional bits to enable the data receiving means of the central control unit to check the accuracy of the received data.

7. A system as claimed in claim 6 in which the data transmitting means includes means for repeating the transmission of the entire data word.

8. A system as claimed in claim 7 in which the data receiver of the central control means includes comparison means operable to compare each bit of an original received data word with the corresponding bit of the repeated data word.

9. A system as claimed in claim 1 in which the periodic signal is of square waveform.

10. A system as claimed in claim 1 in which the periodic signal has a frequency of the order of 400 Hz.

11. A system as claimed in claim 1 in which information is transmitted in either direction at a rate of one bit per half-cycle of the periodic signal.

12. A system as claimed in claim 1 in which the controlled units are blender-type fuel pumps and the central control unit is an operator's control unit.

* * * * *